July 7, 1953     I. J. SULLIVAN     2,644,884
CAM OPERATED TARGET IMAGE HAVING AN IRREGULAR MOVEMENT
Filed June 26, 1950     3 Sheets-Sheet 1
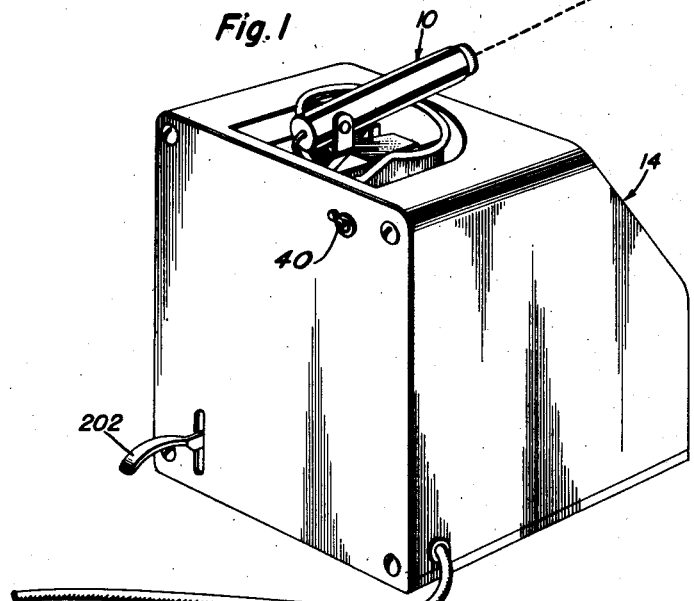
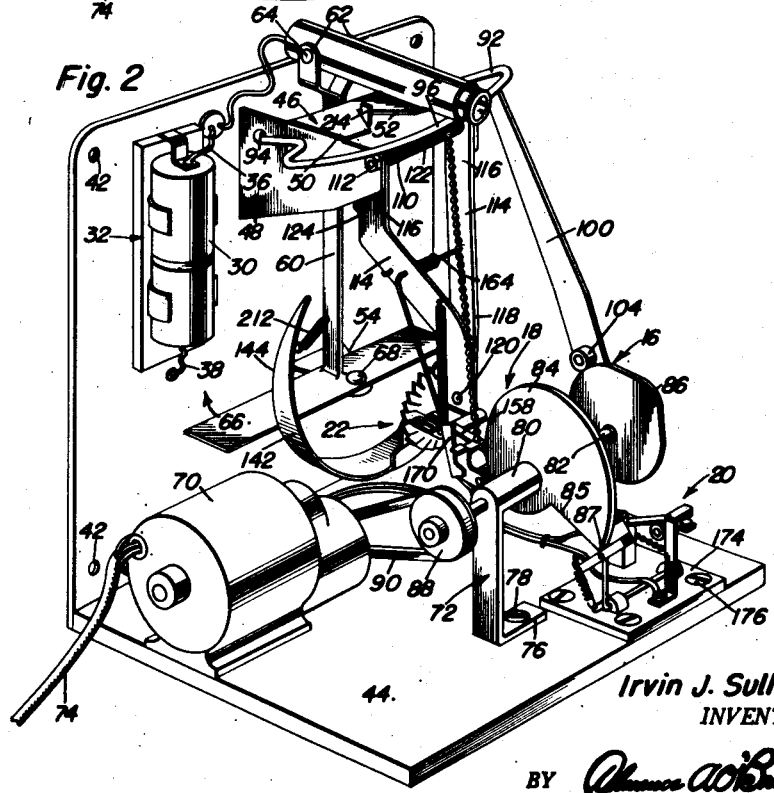
Irvin J. Sullivan
INVENTOR.

July 7, 1953  I. J. SULLIVAN  2,644,884
CAM OPERATED TARGET IMAGE HAVING AN IRREGULAR MOVEMENT
Filed June 26, 1950  3 Sheets-Sheet 2

Irvin J. Sullivan
INVENTOR.

BY

July 7, 1953  I. J. SULLIVAN  2,644,884
CAM OPERATED TARGET IMAGE HAVING AN IRREGULAR MOVEMENT
Filed June 26, 1950  3 Sheets-Sheet 3
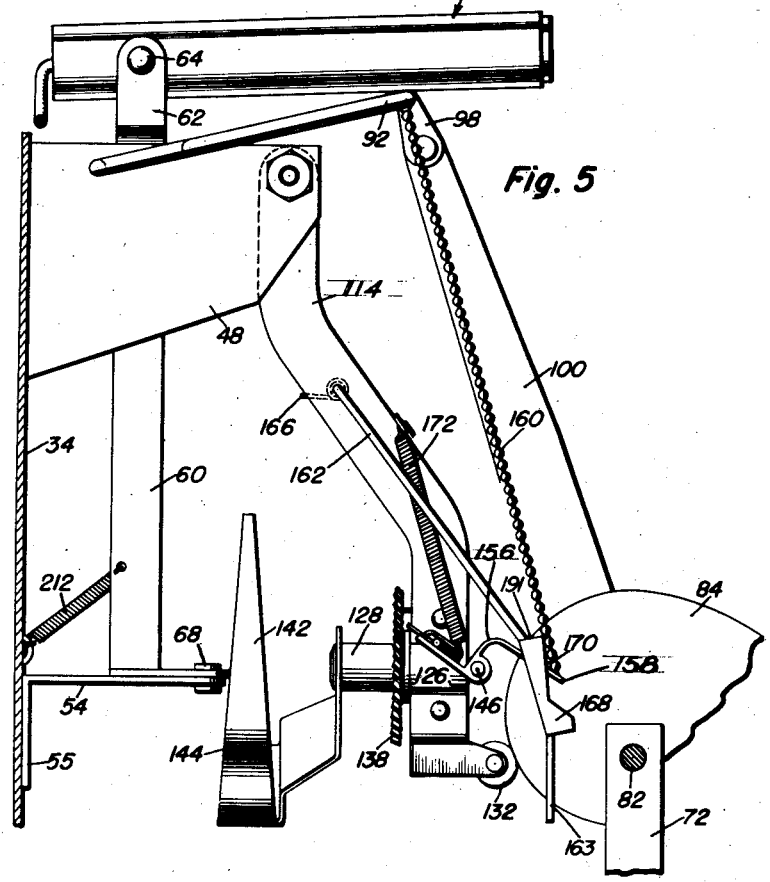
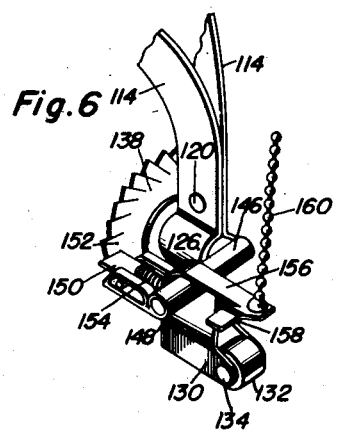
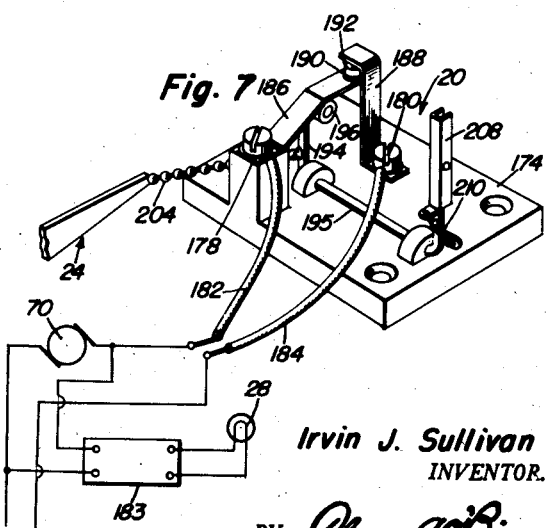
Irvin J. Sullivan
INVENTOR.

Patented July 7, 1953

2,644,884

UNITED STATES PATENT OFFICE 2,644,884

CAM OPERATED TARGET IMAGE HAVING AN IRREGULAR MOVEMENT

Irvin J. Sullivan, Culdesac, Idaho

Application June 26, 1950, Serial No. 170,455

4 Claims. (Cl. 240—48)

1

The present invention relates to improvements in mechanisms for projecting an image onto a screen, and more particularly to the type wherein the mechanism projects a target image which traverses predetermined paths over the screen and in which means are provided for varying the predetermined paths.

An object of the present invention is to provide a cam operated mechanism for projecting an image onto a screen wherein the image traverses an irregular path over the screen.

A further object of the present invention is to provide a target spot projection mechanism wherein means are provided for effecting an irregular path for the target spot and wherein each successive path differs from the previous path in a predetermined manner.

Still another object of the present invention is to provide exchangeable means whereby movement along other paths may be effected.

A further object of the present invention is to provide foot operated means whereby the mechanism is actuated to complete a cycle of movement of the target projection.

This invention also has as an object to provide such means that are positive in operation, convenient in use, economical of manufacture and of general superiority.

The means by which the objects of the present invention are accomplished include a light projector means mounted for universal movement on a frame, first means for driving the projector in a vertical component direction, second means for driving the projector in a horizontal component direction, and third means for varying the resultant component effected by the first and second means after each cycle, foot lever means for closing an electrical circuit, and an electrical motor in the electrical circuit for driving the first, second and third means.

Various other objects and advantages will be apparent from a detailed description to follow. In the description as well as in the claims, parts are at times identified by specific names for convenience, but such nomenclature is intended to be as generic in its application to analogous parts as the prior art will permit.

The best form in which I have contemplated applying my invention is illustrated in the accompanying drawings, wherein:

Figure 1 is a perspective view of the entire mechanism of the present invention;

Figure 2 is a perspective view of the present invention with the casing removed and the interior exposed;

2

Figure 3:
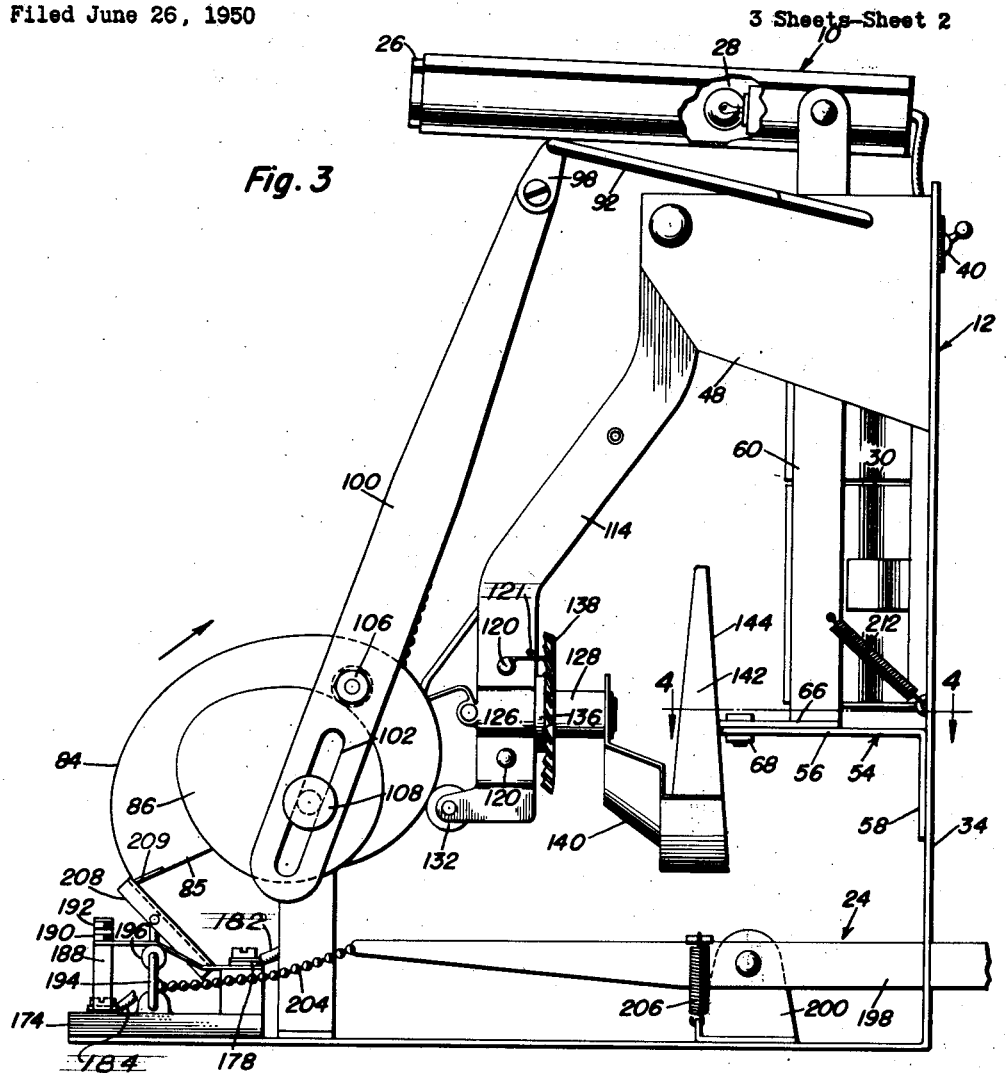
Figure 4:
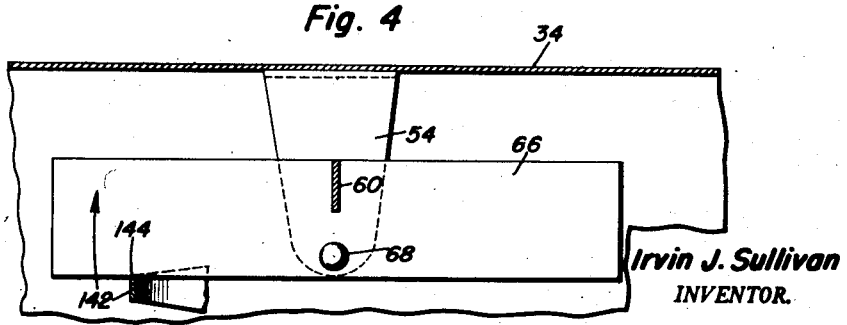

Figure 3 is an elevational view of the mechanism as seen from the right side of Figure 2;

Figure 4 is a horizontal transverse sectional view taken substantially along the plane of line 4—4 of Figure 3;

Figure 5 is a side elevational view with parts broken away as seen from the left in Figure 2;

Figure 6 is a detail perspective view showing the trip mechanism of the present invention; and Figure 7 is a perspective view of the switching mechanism in combination with the electrical circuit.

Referring more particularly to the drawings, wherein like numerals designate like parts throughout, numeral 10 designates generally the light projector means, numeral 12 designates generally the frame of the present invention, numeral 14 designates the casing for enclosing the operating mechanism, numeral 16 designates the first means for driving the projector in a vertical component direction, numeral 18 designates the second means for driving the projector in a horizontal component direction, numeral 20 designates the switch mechanism employed in the present invention, numeral 22 designates the trip mechanism, and numeral 24 designates the foot operated lever for the switch mechanism 20.

The light projector means 10 is of conventional structure, being formed of a tubular member provided with a projection lens 26 and lamp 28, and means for lighting the lamp 28. A pair of batteries 30 are mounted on the clamp bracket 32 which is, in turn, secured to the upstanding back 34 of the frame 12. Electrical connecting wires 36 and 38 are connected to a switch 40 and the lamp 28 of the light projector means 10. By operation of the switch 40, the lamp 28 may be lit when desired.

The frame 12 upon which the entire mechanism of the present invention is mounted, includes an upstanding back wall 34 having a plurality of apertures 42 to which the casing 14 may be secured, a base member 44 secured to the upstanding wall 34, and a bracket 46 secured to the upper inner surface of the back wall 34. The bracket 46 includes a pair of side portions 48 joined by a transversely extending portion 50 having a V-slot 52 centrally disposed thereon. Another bracket 54 formed of angulated portions 56 and 58, is secured to the back wall 34 by means of the angulated portion 58.

The light projector means 10 is mounted on the frame by means of the bifurcated member 60, the tubular projector means 10 being pivotally mounted between the bifurcation 62 by means of the pin 64. The lower end of the member 60 is secured to a transversely extending bar 66 which is pivotally mounted on the angulated portion 56 of the bracket 54 by means of the pin 68.

The base 44 provides a mounting means for the motor 70, the cam supporting bracket 72 and the switch mechanism 20 and foot lever actuating means 24. The electrical motor 70 is conventional and is supplied with power by means of the conduit 74. The sleeve supporting bracket 72 is formed with an angulated portion 76 which is secured to the base 44 by means of screws 78, and is formed at its upper end with a sleeve-like portion 80 which provides a bearing for the cam shaft 82. The cam shaft 82 is provided with a pair of cams 84 and 86 and a sheave 88. The belt 90 provides a connection between the motor 70 and the sheave 88 for giving the desired rotation of the cams 84 and 86.

The first means for driving the projector in a vertical component direction designated generally at 16 includes an angulated wire member 92 which is pivotally mounted on the bracket 46 by its ends 94. The central portion 96 of the member 92 engaging the bottom surface of the tubular projector 10 whereby pivoting movement thereof is effected. A finger element 98 is rigidly secured to the angulated wire member 92 and has pivotally connected thereto a lever arm 100 provided with an elongated slot 102, as best seen in Figure 3. The lever arm 100 is also provided with a roller 104 which is mounted for rotation on the arm 100 by means of the bolt 106. The cam supporting shaft 82 is provided with an enlarged head 108 and is slidably received in the slot 102. As will readily be seen by looking at Figure 3, rotation of the cam 86 will cause reciprocation of the lever arm 100 by means of the roller 104, the lever arm 100 being retained from displacement by means of the slot 102 and the enlarged head 108, and the reciprocating movement of the lever arm 100 causing vertical pivoting of the light projection means 10.

The means for driving the projector in a horizontal component direction includes the second cam 84 which is mounted for rotation on the cam shaft 82. As seen best in Figure 2, a shaft 110 is positioned for pivotal movement in the side portions 48 of the bracket 46 at 112. A pair of angulated straps 114 are pivotally mounted on the rod 110 at their spread ends 116, and have their lower ends 118 joined together by means of pins 120. A coil spring 122 is mounted on the rod 110 and has its ends connected to the straps 116 at 124 whereby the straps 114 are resiliently urged in a direction of the cam shaft 82 and the cam 84.

As best seen in Figure 3, the straps 114 are formed with arcuately bent portions 126, which when joined together form a sleeve in which is mounted for rotation the shaft 128. Figure 6 shows the bottommost ends of the straps 114, 130 in spread relation and having a roller 132 rotatably mounted thereon by means of the pin 134.

The shaft 128 which is mounted for rotation in the sleeve portion 126 of the straps 114, is provided with a flange portion 136 providing a bearing surface for engagement with the straps 114, and has a disk 138 provided with a plurality of stamped stops at its outer periphery secured thereon. The inner end of the shaft 128 has the angulated metallic strap 140 secured thereto. The metal strap 140 is provided with an arcuately bent vertically disposed portion 142 having a tapering surface 144.

Figure 2 readily shows that upon rotation of the shaft 82 the second cam 84 will engage the roller 132 pivoting the straps 114 with respect to the bracket 46, the angulated member 140 being pivoted therewith and the tapering surface 144 will engage the transversely positioned bar 66 effecting pivoting movement of the vertically disposed member 60 with respect to the pin 68, the light projector means 10 being pivoted in a horizontal component direction thereby.

The action of the trip mechanism 22 is best explained by reference to Figures 5 and 6 in conjunction with Figure 3. A pin 146 is secured transversely at the end of the sleeve 126 and extends laterally thereof. A trip catch element 148 is rotatably mounted on the extending end of the pin 146. The catch member 148 has a longitudinally disposed detent 150 slidably disposed therein. The detent 150 is resiliently urged toward engagement with the stops or ratchet teeth 152 on the disk 138 by means of the spring 154. A coil spring 172 is attached to the catch member 148 and is tensioned by attachment to the arm for urging the catch member 148 to rotate about the pin 146 into a raised position as shown in Figure 5. A rearwardly controlled finger 156 is rigidly secured to the latch element 148. The finger 156 has an offset cam follower portion 158. The extremity of the finger 156 is connected to the wire member 92 by a chain 160 so that elevation of the wire member 92 will pull on the finger 156 and rotate the catch element 148 downward against the tensioning spring 172, causing the detent 150 to traverse one or more of the stops 152 of the disk 138 which is held against reverse rotation by the spring dog 121 (see Figure 3). The cam follower 158 of finger 156 normally is controlled by a cam plate 168 secured to wire 162 pivotally mounted on the strap 114 by means of the angulated portion 164, and is biased against the cam follower 158 by means of a coiled tension spring 166. The member 162 extends beyond the cam plate 168 to provide a stop contact 163 for engagement with any suitable stop such as sleeve 80.

Rotation of the cams 84 and 86 produces adjustment of cam 144 by ratchet-like rotation of disk 138. Rotation of cam 86 lifts member 92 and by means of chain 160 raises finger 156 against the tension of spring 172 and detent 150 is moved into position on the stops 152. Elevation of member 92 causes the cam follower 158 to ride along cam face 170 and at maximum elevation of member 92 the cam follower 158 will be received on stop surface 191. Further movement of cam 86 will release the pull on chain 160 but stop 191 prevents motion of finger 156 and latch 148. At the same time cam 84 is advancing roller 132 so that cam 144 contacts operating bar 66 and rotates element 60 as set out above. At the end of the cam movement, roller 132 drops from point 87 to point 85. Intermediate this motion, the end 163 will strike a stop such as sleeve 80 and be depressed to release portion 158 from stop 191, allowing spring 172 to rotate catch 148 which advances disk 138 because of the engagement of detent 150 with stops 152. The adjustment thus constantly presents a different portion of the cam 144 so that the path of target movement varies from cycle to cycle.

The switch mechanism 20 includes a base 174 which is secured to the base 44 of the frame 12 by means of screws 176. The base 174 is provided with a pair of terminals 178 and 180 to which are connected electrical connecting wires 182 and 184 which complete the circuit for the electrical motor 70 and the lamp 28. The terminal 178 is provided with a spring contact 186, and the terminal 180 is provided with a vertically disposed contact 188. The contacts 186 and 188 are provided with contact buttons 190 and 192 whereby when the contact buttons are urged together the circuit is completed.

The means for closing the switch includes a pivotally mounted upstanding element 194 having a roller 196 engaging the underside of the contact element 186. A foot operated lever 198 is pivotally mounted on the bracket 200 which is mounted on the base 44. The end of the foot operated lever 198 remote from the foot pedal 202 has a chain 204 connected thereto which is, in turn, connected to the upstanding element 194. It will readily be seen that upon depressing the foot pedal 202 the chain 204 will become taut pivoting the element 194, and by means of the roller 196, the contact element 186 will be urged upwardly until the circuit is completed. It should also be noted that when the circuit is completed the roller will be in locked position, and the foot of the operator need not be retained on the foot pedal 202 in order to keep the circuit completed.

As seen best in Figures 2 and 7, a switch de-actuating element 208 is mounted for pivotal movement with the upstanding element 194 and has a spring 210 connected between the end of the element 208 and the element 194 for normally urging the elements into substantial alignment with each other. The de-actuating element 208 is engageable by the cam projection 209. It will readily be seen that when the cam 84 reaches the position shown in Figure 2, the de-actuating element 208 will move the rod 194 to a vertical position to separate the buttons 190 and 192 after which the element will be forced to the position there shown with the spring 210 under tension. Upon further rotation of the cam 84 the de-actuating element 208 will return to its normal position as shown in Figure 7. The main switch arrangement of the modifications of Figures 2 and 7 are identical, but the circuit arrangements differ in that in Figure 2 the lamp 28 is energized from batteries 32, and in Figure 7 lamp 28 is energized through a transformer 183.

Looking again at Figure 2, it will be seen that the upstanding element 60 is provided with a spring 212 for holding in a normally centrally disposed position the projector 10. The upstanding element 60 is also provided with an offset finger 214 for engagement in the V-slot 52 for centering the projector in its normally inoperative position.

From the foregoing description taken in conjunction with the drawings, it is believed that the operation will be readily apparent to one skilled in the art. Upon depressing the foot pedal 202 the switch is closed and held in locked position by the tension of the spring contact 186, thereby actuating the electrical motor 70 and lighting the lamp 28 through the transformer 183. Rotation of the motor shaft is conveyed to the cam shaft by means of the belt and pulley arrangement giving the desired rate of rotation to the first and second cams. The vertical movement of the light projector is effected, as hereinabove set forth, by means of the arm and roller arrangement engaging the first cam 86 and pivoting the wire element 92 mounted on the bracket 46. At the same time vertical movement is imparted to the light projector, the second cam 84 is engaging the roller 132 of the arms 114 causing pivoting movement about the bracket 46, the arcuately bent element 142 engaging the transversely disposed bar 66 for imparting rotation about the pin 68. The movement of the bar 66 is imparted to the light projector through the upstanding element 60 and the bifurcated end 62 and pivot point 64.

With this arrangement, it is possible to substitute cams or arcuately bent members, having desired cam surfaces, for the cams and arcuately bent members shown.

Having described the invention, what is claimed as new is:

1. A target spot projector mechanism comprising a frame, a light projector means mounted for universal movement on said frame, first means for driving said projector in a vertical component direction, second means for driving said projector in a horizontal component direction, and third means for varying the resultant component effected by said first and second means after each cycle, said third means including a supporting lever pivotally mounted on said frame, a disk rotatably mounted on said lever, a roller mounted on said supporting lever and engageable with a second cam for imparting pivoting movement to said supporting lever, vertically disposed lever means for pivoting said light projector in a horizontal direction, a transverse bar secured to one end of said vertically disposed lever means, an arcuately bent strap mounted for rotating movement on said supporting lever, said strap having a tapering surface engageable with said transverse bar, and means for rotating said disk and said strap after each cycle of said second cam whereby a different portion of said strap engages said transverse bar thereby pivoting said bar a predetermined and varying amount for each cycle.

2. A target spot projector mechanism comprising a frame, a light projector means mounted for universal movement on said frame, first means for driving said projector in a vertical component direction, second means for driving said projector in a horizontal component direction, and third means for varying the resultant component effected by said first and second means after each cycle, said third means including a supporting lever pivotally mounted on said frame, a disk rotatably mounted on said lever, a roller mounted on said supporting lever and engageable with a second cam for imparting pivoting movement to said supporting lever, vertically disposed lever means for pivoting said light projector in a horizontal direction, a transverse bar secured to one end of said vertically disposed lever means, an arcuately bent strap mounted for rotating movement on said supporting lever, said strap having a tapering surface engageable with said transverse bar, and means for rotating said disk and said strap after each cycle of said second cam whereby a different portion of said strap engages said transverse bar thereby pivoting said bar a predetermined and varying amount for each cycle, said last named means including a spring biased trip catch engageable with stops on said disk.

3. A target spot projector comprising a frame, a support bar pivotally mounted on said frame, an actuating bar secured transversely of said support bar, cam means imparting movement to said actuating bar to oscillate said support bar about its pivots, a tapering surface interposed between said first-mentioned cam and said actuating bar, means adjusting the position of said tapering surface between each oscillation, a light projector pivotally mounted on said support bar, cam means oscillating said light projector about its pivot point on said support.

4. A target spot projector comprising a frame, a support bar pivotally mounted on said frame, an actuating bar secured transversely of said support bar, cam means imparting movement to said actuating bar to oscillate said support bar about its pivots, an arcuately bent tapering strip interposed between said first-mentioned cam and said actuating bar, a disk supporting said strip, means rotating said disk in steps, a light projector pivotally mounted on said support bar, cam means oscillating said light projector about its pivot point on said support.

IRVIN J. SULLIVAN.

References Cited in the file of this patent

UNITED STATES PATENTS

| Number | Name | Date |
|---|---|---|
| 1,598,433 | Fuod | Aug. 31, 1926 |
| 1,887,708 | Cameron | Nov. 15, 1932 |
| 2,228,551 | Younghusband | Jan. 14, 1941 |
| 2,335,257 | Binks | Nov. 30, 1943 |
| 2,442,240 | Hooker et al. | May 25, 1948 |
| 2,464,318 | Kennelly | Mar. 15, 1949 |